United States Patent [19]

Krummheuer et al.

[11] Patent Number: 5,508,073
[45] Date of Patent: Apr. 16, 1996

[54] UNCOATED FABRIC FOR MANUFACTURING AIR BAGS

[75] Inventors: Wolf R. Krummheuer; Dieter Kaiser, both of Wuppertal; Hans A. Graefe, Schwelm; Volker Siejak, Duisburg, all of Germany

[73] Assignee: Akzo NV, Arnhem, Netherlands

[21] Appl. No.: 112,463

[22] Filed: Aug. 27, 1993

Related U.S. Application Data

[63] Continuation-in-part of Ser. No. 840,002, Feb. 24, 1992, abandoned.

[30] Foreign Application Priority Data

Feb. 26, 1991 [DE] Germany .......................... 41 05 943.3
Jan. 7, 1992 [DE] Germany .......................... 42 00 161.7

[51] Int. Cl.⁶ .................................................. B65B 53/00
[52] U.S. Cl. ...................... 428/35.1; 428/229; 280/728.1
[58] Field of Search ................................ 428/224, 225, 428/35.1, 229; 280/728

[56] References Cited

U.S. PATENT DOCUMENTS

| | | | |
|---|---|---|---|
| 3,842,583 | 10/1974 | Gage | 57/243 |
| 3,888,504 | 6/1975 | Bonn et al. | 280/743.1 |
| 4,921,735 | 5/1990 | Bloch | 428/34.9 |
| 4,977,016 | 12/1990 | Thornton et al. | 428/225 |
| 5,093,163 | 3/1992 | Krummheuer et al. | 428/35.1 |
| 5,236,775 | 8/1993 | Swoboda et al. | 428/225 |

FOREIGN PATENT DOCUMENTS

| | | |
|---|---|---|
| 974745 | 9/1975 | Canada . |
| 0314867 | 5/1989 | European Pat. Off. . |
| 0436950 | 7/1991 | European Pat. Off. . |
| 0442373 | 8/1991 | European Pat. Off. . |
| 0454213 | 10/1991 | European Pat. Off. . |
| 2164627 | 7/1972 | Germany . |
| 3903216 | 8/1990 | Germany . |
| 64-041438 | 2/1989 | Japan . |
| 6441438 | 2/1989 | Japan . |
| 90/09295 | 8/1990 | WIPO . |

OTHER PUBLICATIONS

WILA–GMA, Abstract for German reference No. 87 14 595, Mar. 1988, p. 501.

*Primary Examiner*—Christopher W. Raimund
*Attorney, Agent, or Firm*—Oliff & Berridge

[57] ABSTRACT

Uncoated, tightly woven, synthetic filament yarn fabric for manufacturing an air bag. The fabric is manufactured from polyamide yarns having a filament linear density of less than 4 dtex. The air permeability of this fabric is <10 l/dm²·min and its specific stiffness is <1.0×10⁻².

10 Claims, No Drawings

UNCOATED FABRIC FOR MANUFACTURING AIR BAGS

CROSS-REFERENCE TO RELATED APPLICATION

This application is a continuation-in-part of U.S. patent application Ser. No. 07/840,002 filed Feb. 24, 1992, now abandoned, the entire disclosure of which is incorporated herein by reference.

FIELD OF THE INVENTION

The invention relates to an uncoated, tightly woven, synthetic filament yarn fabric for manufacturing an air bag.

BACKGROUND

Fabrics used for manufacturing air bags are required to have, in particular, a low air permeability. Previously, a low air permeability has been mainly achieved by coating the air bag fabric. However, coated fabrics, besides being more expensive to produce, also have appreciable disadvantages in use. In particular, one disadvantage is the increased space required, as compared with uncoated fabrics, for accommodation in the steering wheel.

For this reason, processes for manufacturing uncoated air bag fabrics have been developed. Here, the required low air permeability is achieved through a very tight fabric construction and through special measures in finishing such as calendering (e.g. EP-A-314,867) or heat setting (e.g. CA-A-974,745).

It is true that low air permeability is the most important requirement of an air bag fabric, but a serviceable fabric of this kind must additionally meet a number of other important requirements, of which high strength and good foldability are particularly important. The latter requirement is crucial if the air bag is to be accommodated in the steering wheel of motor vehicles in the least amount of space. However, good foldability also makes possible trouble-free inflation of the air bag for protecting the vehicle occupant in the event of an accident.

To be able to obtain high strengths, air bags have previously been manufactured using, in particular, yarns having a high filament linear density. For instance, U.S. Pat. No. 3,842,583 proposes for this purpose yarns having a filament linear density of 6.0–6.2 den (6.6–6.8 dtex).

CA-A-974,745 proposes a yarn having a filament linear density of 6 den (6.7 dtex).

Although U.S. Pat. No. 4,977,016 specifies a yarn linear density range of 400–600 den (440–660 dtex) for 100–300 individual filaments, the invention is described in the embodiment examples only in terms of a yarn having a linear density of 440 den and 100 individual filaments, which corresponds to a filament linear density of 4.4 den (4.8 dtex).

It is true that these linear densities give the required strength, but they have the appreciable disadvantage of high stiffness, which has a very adverse effect on foldability. The least-space requirement for accommodating the air bag, for example in the steering wheel of the vehicle, and trouble-free inflation cannot be adequately achieved with linear densities of this order of magnitude.

Similarly, very low filament linear densities have been proposed for manufacturing air bag fabrics. For instance, JP-A-64-041,438 proposes to manufacture coated air bag fabric yarns with filament linear densities below 3 den (3.3 dtex). These low linear densities do not cause problems when used for coated fabrics because a tight weaving is not necessary in this case. Normally manufacturing a yarn with a low filament linear density in the man-made fiber industry is more difficult than manufacturing a yarn with a higher filament linear density. As a consequence of more breakages in the spinning and drawing stages, a yarn with a lower filament linear density results in a more fluffy material than a yarn with a higher filament linear density. Especially in view of the tight weaving needed to manufacture uncoated air bag fabrics, a fluffy material results in difficulties and therefore in a lower weaving efficiency.

SUMMARY OF THE INVENTION

An object of the present invention is to develop a fabric for manufacturing air bags which fully meets the air bag fabric requirements, such as low air permeability, high strength and high abrasion resistance at the folds, which makes possible soft cushioning of the vehicle occupants in the event of an accident, and which is also inexpensive to manufacture and further process.

It has now been found, surprisingly, that these requirements can be satisfactorily met only with polyamide yarns of low filament linear densities. This is because only if polyamide yarns having a filament linear density below 4 dtex are used does the resulting fabric fully guarantee the properties required of air bag fabrics in respect of air permeability, strength and, in particular, foldability. Polyamide yarns having a low filament linear density can be manufactured inexpensively with a low amount of lints according to the invention.

Furthermore, polyamide yarns having a filament linear density lower than 4 dtex additionally offer the particular advantage of lower air permeability compared with yarns of equal yarn but higher filament linear densities. This means that such polyamide yarns make it possible to use fewer threads in the fabric and yet, through suitable finishing conditions, obtain a fabric having the low air permeability required for air bags. Thus, these polyamide yarns, compared with the yarns of higher filament linear density, yield a distinct cost benefit in fabric manufacture.

DETAILED DESCRIPTION OF PREFERRED EMBODIMENTS

Suitable yarn linear densities range from 200 to 600 dtex. Experiments were carried out with polyamide yarns of 235 dtex and 72 filaments, 235 f 72 (filament linear density 3.3 dtex), 350 f 94 (filament linear density 3.7 dtex), 470 f 144 (filament linear density 3.3 dtex), 350 f 120 (filament linear density 2.9 dtex), and 350 f 144 (filament linear density 2.4 dtex).

The polyamide yarns to be used for manufacturing air bag fabrics preferably have a tenacity of at least 60 cN/tex and an elongation of 15–30%. This meets specifications issued by the automotive manufacturers in a particularly advantageous manner.

Air bag fabrics can be manufactured with any synthetic filament yarn which meets the above-mentioned tenacity and elongation values. However, polyamide yarns have been found to be particularly highly suitable. Compared with polyester yarns, for example, they have the significant advantage of higher elasticity, which is due to a flatter course of the load-extension line in the initial region. Of particular suitability for use in air bag fabrics are yarns made of nylon 6.6. Particular preference is given here to yarns made of nylon 6.6 which contain a heat stabilizer introduced in the course of the polycondensation.

The fabrics are manufactured in a tight construction, preferably in a plain or Panama weave. However, it is also possible to use twill weaves. In the case of a polyamide yarn linear density of 235 dtex, 26–30 threads per cm are used in warp and weft. If the polyamide yarn has a linear density of 350 dtex, 23–27 threads per cm are used. If polyamide yarns having a linear density of 470 dtex are used, then 19–23 threads per cm are employed. The numbers quoted here relate to a plain weave. In the case of a Panama weave with a yarn linear density of 235 dtex the numbers are, for example, 34–38 threads per cm in warp and weft.

An important requirement is a substantially symmetrical fabric sett; that is, the fabric must have the same, or virtually the same, number of threads per cm in both warp and weft. Only such setts make it possible to meet the automotive manufacturers' demands for equal strength in warp and weft.

The desired air permeability is achieved with the aid of a wet process, described in EP-A-436,950. It involves shrinking in an aqueous bath within the temperature range between 60°–140° C. This is followed by drying only and no heat setting. The precondition for this process is that the polyamide yarns used have a hot air shrinkage of 6–10% (measured at 190° C.). Yarns with these shrinkage values are used for the production of the so-called contact fabrics of the air bag. For this kind of fabrics an air permeability of <10 $l/dm^2 \cdot min$ at a test pressure difference of 500 Pa is required by the automotive manufacturers.

Normally the air bag consists of a contact part and a filter part. For the so-called filter fabrics, air permeabilities of 20–100 $l/dm^2 \cdot min$ at a test pressure difference of 500 Pa are required. For the manufacturing of filter fabrics, the polyamide yarns have hot air shrinkages of 1.5–5.5% (measured at 190° C.).

The invention is preferred for the production of contact fabrics but it is also suitable for the production of filter fabrics. The fabrics manufactured according to the present invention readily meet even the very low air permeability required for the contact part of the air bag.

As shown in the following table, the fabrics manufactured according to the present invention from polyamide yarns, having a filament linear density of less than 4 dtex, always give a lower air permeability than if polyamide yarns of higher filament linear densities are used:

| Yarn type | Filament linear density (dtex) | Threads per cm warp | Threads per cm weft | Air permeability (ldm² · min at 500 Pa) |
|---|---|---|---|---|
| 235 f 36 | 6.5 | 28.8 | 27.9 | 7.7 |
| 235 f 72 | 3.3 | 27.8 | 27.7 | 3.1 |
| 350 f 72 | 4.9 | 25.2 | 25.7 | 5.8 |
| 350 f 94 | 3.7 | 25.0 | 24.6 | 4.1 |
| 350 f 120 | 2.9 | 24.8 | 24.6 | 3.1 |

The comparative experiments recited in this table were each carried out with the same number of threads for the polyamide yarns having finer and coarser filament linear densities. Further experiments have shown that the number of threads per cm can be reduced on average by 2 threads per cm in warp and weft if polyamide yarns having a filament linear density of less than 4 dtex are used in place of the previous, customary polyamide yarns having a filament linear density of 5.0–6.5 dtex. Even with this fewer number of threads, it is still no problem to achieve the required air permeabilities of <10 $l/dm^2 \cdot min$. Consequently, by using polyamide yarns having a filament linear density of less than 4 dtex instead of the previously used polyamide yarns having a filament linear density of 5.0–6.5 dtex, it is possible to achieve a cost saving at the fabric manufacturing stage.

The air permeability of the fabrics according to the present invention was tested along the lines of DIN 53887. However, in departure from this DIN standard the test pressure difference was raised to 500 Pa in order that a discernible test signal was still obtainable with the fabrics manufactured according to the present invention.

A linear density of less than 4 dtex has a particularly advantageous effect on the foldability of air bag fabrics. This lower filament linear density compared with the polyamide yarn predominantly used previously (filament linear density >5 dtex) brings about a reduction in the stiffness of the air bag fabric, thereby distinctly improving the foldability. Consequently, less space is required to accommodate the air bag in the motor vehicle, for example in the steering wheel. Moreover, however, a low stiffness and hence better foldability of the air bag fabric also brings about trouble-free inflation of the air bag in the event of the air bag function being triggered, thereby improving in a particularly advantageous manner the protective effect of the air bag on the vehicle occupants in the event of an impact. This is of particular importance in the event of out-of-position contact when the seat position of the vehicle occupant differs from the standard position. If the air bag function is triggered in this situation, air bags manufactured with polyamide yarns having filament linear densities >5 dtex give rise to a sudden impact of the inflated air bag on the vehicle occupant with an attendant risk of injury, while, if air bag fabrics made of polyamide yarns having filament linear densities of less than 4 dtex are used, the higher flexibility of the fabric and hence the better adaptability to the body shape of the vehicle occupant makes softer cushioning possible. Very particular advantages have been found to be possessed by fabrics made of polyamide yarns having a filament linear density of less than 4 dtex. Compared with polyester, for example, polyamide has a higher flexibility and thus the positive effect of yarns having a filament density of less than 4 dtex is additionally enhanced by the high flexibility of the polyamide.

The lower stiffness and hence better foldability of fabrics made of polyamide yarns having a filament linear density of less than 4 dtex compared with fabrics made of the hitherto used polyamide yarns having a filament linear density of about 5 dtex or higher is shown in the following table:

| Yarn type | Filament linear density (dtex) | Specific Stiffness |
|---|---|---|
| 235 f 36 | 6.5 | $1.35 \cdot 10^{-2}$ |
| 235 f 72 | 3.3 | $0.68 \cdot 10^{-2}$ |
| 350 f 72 | 4.9 | $0.95 \cdot 10^{-2}$ |
| 350 f 94 | 3.7 | $0.80 \cdot 10^{-2}$ |
| 350 f 120 | 2.9 | $0.64 \cdot 10^{-2}$ |

The test fabrics were manufactured in a plain weave with the numbers of threads per cm in accordance with the above-stated particulars.

The bending stiffness was tested with a Taber stiffness tester, Model 150 B, from Taber Instruments. This instrument determines the moment needed to deflect the end of a sample 38 mm in width and 50 mm in length, clamped at one end, through an angle of 15°. The unit of measurement is the stiffness unit (SU). 1 SU is the bending moment (in cN·cm)

of a sheetlike test specimen, having the stated width, which is being deflected through 15°. Contrary to the customary, clamped length of 50 mm, however, the above-mentioned experiments were carried out with a clamped length of 10 mm.

To enable an objective comparison to be made between different fabrics, the specific stiffness was calculated according to the following formula:

$$\text{Specific stiffness} = \frac{\text{Bending stiffness} \times \text{air permeability}}{\text{Linear density}}$$

In addition to the stiffness unit SU determined by the above-mentioned method, the specific stiffness is affected by the yarn linear density and the air permeability as an indirect measure of the fabric density.

It has been determined that there is a correlation between the filament linear density and the resulting fabric's specific stiffness. Decreasing the filament linear density results in a lower specific stiffness and therefore in a better foldability of the fabric.

Until now it was difficult to produce yarns with a filament linear density <3.5 dtex without a too high amount of lints. By several adjustments in the polyamide filament manufacturing process, however, it is possible to produce yarns having a lower filament linear density with an acceptable amount of lint. One adjustment in this regard is improving the filtering of the polyamide melt used to spin the filaments. By using filter screens with a lower mesh size, for example, non-optimally melted particles that can cause breaks during spinning are excluded.

A second important adjustment involves changing the spinneret geometry (the arrangement of openings in the spinneret plate) to maximize the distance between adjacent openings so as to avoid contact between filaments during spinning. This adjustment may be made without changing the number of spinneret openings and therefore without decreasing production efficiency.

A third adjustment in the manufacturing process to produce yarns having lower filament linear densities involves improving the quenching conditions. By changing the guidance of the cooling air in the quenching zone to account for the changes in spinneret geometry and other production parameters, it is possible to improve the results of spinning and provide a yarn with a lower amount of breakage.

A fourth adjustment in the manufacturing process to produce a lower filament linear density yarn involves changing the finish applied to the yarn after spinning. Finishes function to improve the drawing of the filaments; however, certain conventional finishes are deposited on the drawing machine's godets during drawing. By selecting a finish that does not build up deposits on the godets, drawing may be improved so as to permit yarns having a lower filament linear density and lower lint content to be produced.

The above adjustments in the manufacturing process allow the production of polyamide yarns having a filament linear density of from about 0.5 dtex to 3.9 dtex, preferably from about 2.0 dtex to 3.9 dtex. These adjustments also produce significant reductions in lint content, as shown in the table below ("new method" data):

| Yarn type | Filament linear density (dtex) | Lints per t |
|---|---|---|
| 235 f 36 | 6.5 | 350 |
| 235 f 72 | 3.3 | 1800 |
| 470 f 72 | 6.5 | 300 |
| 470 f 104 | 4.5 | 800 |
| 470 f 144 (new method) | 3.3 | 700 |
| 350 f 144 (new method) | 2.4 | 1200 |

The choice of a filament linear density of less than 4 dtex for the polyamide yarns envisaged for air bag manufacture results in an air bag system which is safer than that of the prior art. Fabrics manufactured from these polyamide yarns readily meet the automotive manufacturers' demands for high strength and low air permeability. In addition, the higher flexibility and better unfoldability on triggering of the air bag function with the fabrics manufactured according to the present invention give safer cushioning of the vehicle occupant.

EXAMPLE 1

A 235-dtex, 72-filament nylon 6.6 yarn, the filament linear density accordingly being 3.3 dtex, was used to manufacture an air bag fabric by plain weaving with 28 threads per cm in warp and weft. The fabric was treated in an aqueous bath on a jigger for shrinking.

The treatment was started at 40° C. and the treatment temperature was raised to 95° C. The actual shrinking took place at that temperature. The fabric was then dried on a stenter at 150° C. The fabric was found to have an air permeability of 3.1 l/dm$^2$·min and a specific stiffness of $0.68 \cdot 10^{-2}$.

A comparative experiment with a 235-dtex 36-filament yarn, corresponding to a filament linear density of 6.5 dtex, under the same manufacturing conditions in weaving and the same finishing conditions gave an air permeability of 7.7 l/dm$^2$·min and a specific stiffness of $1.35 \cdot 10^{-2}$.

EXAMPLE 2

A 350-dtex, 94-filament nylon 6.6 yarn, which accordingly had a filament linear density of 3.7 dtex, was used to manufacture an air bag fabric by plain weaving with 25 threads per cm in warp and weft. The wet treatment and drying were carried out as in Example 1. The fabric was found to have an air permeability of 4.1 l/dm$^2$·min and a specific stiffness of $0.80 – 10^{-2}$.

A comparative experiment with a 350-dtex 72-filament yarn, corresponding to a filament linear density of 4.9 dtex, under the same manufacturing conditions in weaving and the same finishing conditions gave an air permeability of 5.8 l/dm$^2$·min and a specific stiffness of $0.95 \cdot 10^{-2}$.

EXAMPLE 3

A 350-dtex, 120-filament nylon 6.6 yarn, which accordingly had a filament linear density of 2.9 dtex was used to manufacture an air bag fabric by plain weaving with 25 threads per cm in warp and weft. The wet treatment and drying were carried out as in Example 1. The fabric was found to have an air permeability of 3.1 l/dm$^2$·min and a specific stiffness of $0.64 \cdot 10^{-2}$.

The comparative experiment was the same as mentioned in Example 2.

What is claimed is:

1. An uncoated, tightly woven, synthetic filament yarn fabric for manufacturing an air bag, wherein the yarn used to construct the fabric is a polyamide yarn having a filament linear density of less than 4 dtex and a yarn linear density of 200–600 dtex, and wherein said fabric has a specific stiffness of $<1.0 \times 10^{-2}$ and an air permeability $<10$ l/dm$^2$·min, said air permeability obtained by shrinking the fabric in a wet process.

2. The fabric according to claim 1, wherein the fabric has an at least substantially symmetrical sett.

3. The fabric according to claim 1, wherein the fabric is wet treated in a temperature range of 60°–140° C.

4. The fabric according to claim 3, wherein the fabric is wet treated in a temperature range of 60°–140° C. in the absence of any prior or subsequent heat setting.

5. The fabric according to claim 1, wherein the polyamide yarn has a filament linear density of from about 0.5 dtex to 3.9 dtex.

6. The fabric according to claim 5, wherein the polyamide yarn has a filament linear density of from about 2.0 dtex to 3.9 dtex.

7. An air bag made of the fabric of claim 1.

8. An air bag system comprising an air bag according to claim 7.

9. An air bag made of the fabric of claim 4.

10. An air bag system comprising an air bag according to claim 9.

* * * * *